ADJUSTABLE FREQUENCY CONTROL SYSTEM

Original Filed July 13, 1964 5 Sheets-Sheet 1

Inventor
Robert L. Risberg
By Wm. A. Autio
Attorney

ADJUSTABLE FREQUENCY CONTROL SYSTEM

Original Filed July 13, 1964 5 Sheets-Sheet 2

ADJUSTABLE FREQUENCY CONTROL SYSTEM
Original Filed July 13, 1964 5 Sheets-Sheet 3
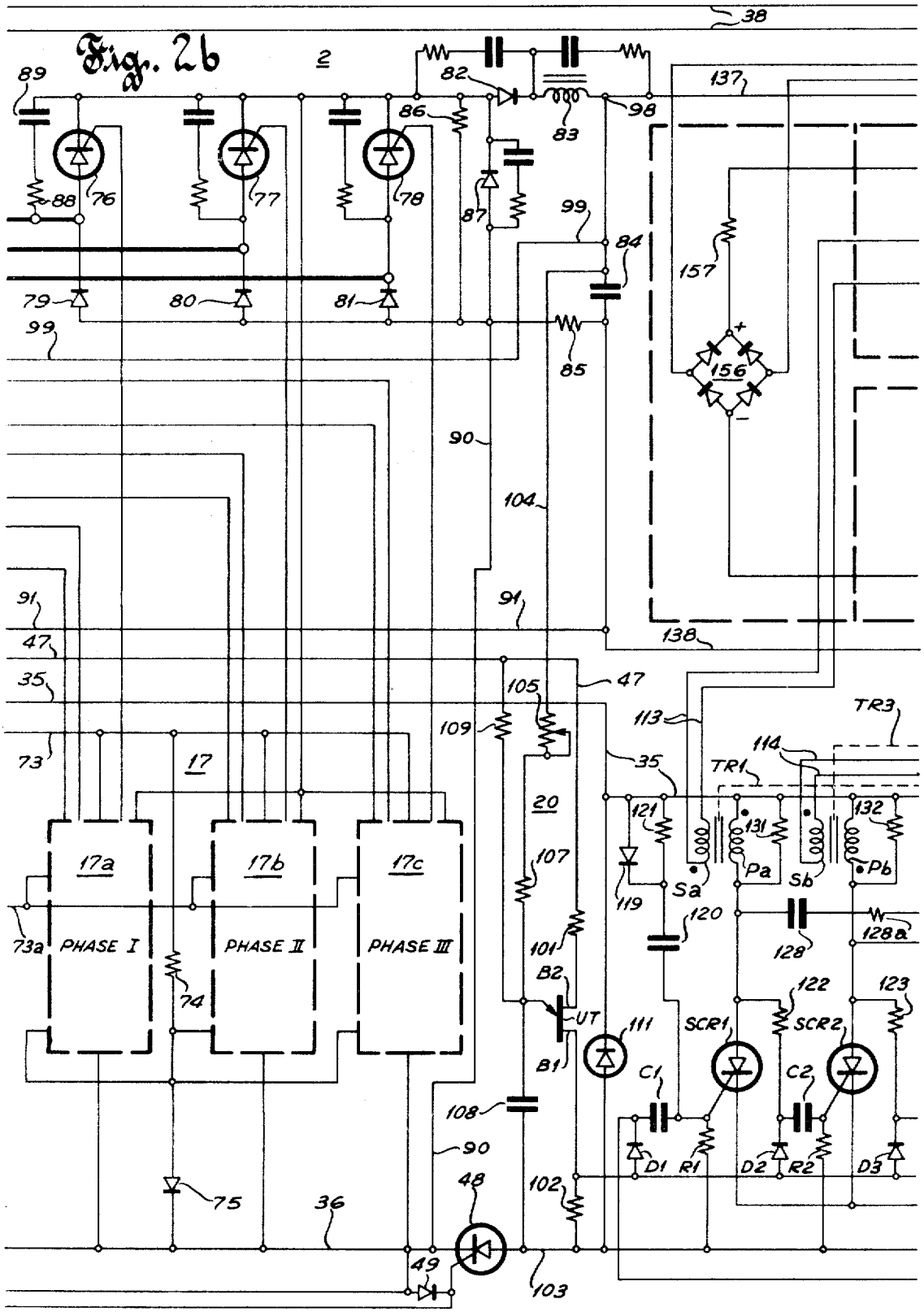

ADJUSTABLE FREQUENCY CONTROL SYSTEM

Original Filed July 13, 1964 5 Sheets-Sheet 4

ADJUSTABLE FREQUENCY CONTROL SYSTEM

Original Filed July 13, 1964 5 Sheets-Sheet 5

Inventor
Robert L. Risberg
By Wm. A. Autin
Attorney

United States Patent Office

Re. 27,040
Reissued Jan. 26, 1971

27,040

ADJUSTABLE FREQUENCY CONTROL SYSTEM

Robert L. Risberg, Milwaukee, Wis., assignor to Cutler-Hammer, Inc., Milwaukee, Wis., a corporation of Delaware Original No. 3,344,326, dated Sept. 26, 1967, Ser. No. 381,970, July 13, 1964. Application for reissue Feb. 26, 1969, Ser. No. 807,464

Int. Cl. H02p *5/28*

U.S. Cl. 318—230 24 Claims

Matter enclosed in heavy brackets [ ] appears in the original patent but forms no part of this reissue specification; matter printed in italics indicates the additions made by reissue.

*ABSTRACT OF THE DISCLOSURE*

*A control system supplied from a three-phase A.C. power source for supplying adjustable frequency power to control the speed of an A.C. motor and including rectifying and controlling apparatus for providing an adjustable voltage D.C. supply to an SCR inverter that supplies adjustable frequency power to the motor and feeds back energy to the D.C. supply to provide a resultant voltage controlled by motor operation, a firing circuit for the inverter, and means for integrating such resultant voltage to control the firing circuit and the output frequency.*

*SUMMARY OF THE INVENTION*

This invention relates to adjustable frequency alternating current control systems and more particularly to adjustable frequency alternating current motor control systems of the static type.

While not limited thereto, the invention is especially applicable to adjustable speed control of a squirrel cage motor.

An object of the invention is to provide an improved adjustable frequency control system of the static type.

A more specific object of the invention is to provide an improved solid state adjustable frequency control system.

Another specific object of the invention is to provide an improved adjustable magnitude and proportionally adjustable frequency squirrel cage motor control system.

Another specific object of the invention is to provide such system with improved and simplified regulating means.

Other objects and advantages of the invention will hereinafter appear.

According to the invention, there is provided a static, adjustable speed control system for a squirrel cage motor. The control system which is of the solid state type is supplied from a three-phase alternating current power supply source and applies three-phase square wave, adjustable frequency alternating current to a squirrel cage motor. The system is provided with a controllable three-phase bridge for receiving supply current through line inductors and for rectifying the supply current to obtain unidirectional voltage of adjustable magnitude. This unidirectional voltage is applied through a smoothing LC filter to an electronic inverter of the silicon controlled rectifier (SCR) type to obtain adjustable frequency A.C. for controlling the speed of the squirrel cage motor. The speed of the motor is proportional to the output frequency of the inverter. The system is also provided with a control and regulating circuit and a three-phase firing circuit for controlling the three-phase bridge. The three-phase firing circuit is provided with means for supplying firing pulses to the silicon controlled rectifiers in the three-phase rectifier bridge in a predetermined repetitively sequential order. The control and regulating circuit is provided with means for starting the system operating and means for controlling the three-phase firing circuit to adjust the phase angle of the firing pulses thereby selectively to adjust the output voltage of the three-phase bridge. This means includes both manual control and automatic mechanical control from a transducer or the like to adjust the firing angle and a switch for selecting either the manual or automatic control. The control and regulating circuit is also provided with means for receiving feedback, current limit and IR compensation signals from the three-phase rectifier bridge output and for regulating the three-phase firing circuit in accordance therewith. In connection with the latter, solid state amplifier means is provided for performing the regulating function in a simple and effective manner. The system is further provided with a solid state, modified ring firing circuit of the shift register type for controlling firing of the silicon controlled rectifiers in the inverter with adjustable frequency. A solid state relaxation oscillator is provided for controlling the output frequent of the shift register. The oscillator frequency is controlled by the output voltage of the three-phase rectifier bridge as the slave of amplitude except for [present] *preset* minimum frequency so that the output frequency to the motor and consequently the motor speed is ultimately controlled either manually or automatically from the reference voltage at the control and regulating circuit.

*BRIEF DESCRIPTION OF THE DRAWINGS*

These and other objects and advantages of the invention and the manner of obtaining them will best be understood by reference to the following description of an embodiment of an adjustable frequency control system taken in conjunction with the accompanying drawings, wherein.

FIGS. [2a–e] *2a–c* constitute a circuit diagram showing details of the system of FIG. 1.

*DESCRIPTION OF THE PREFERRED EMBODIMENT*

Figure 1:
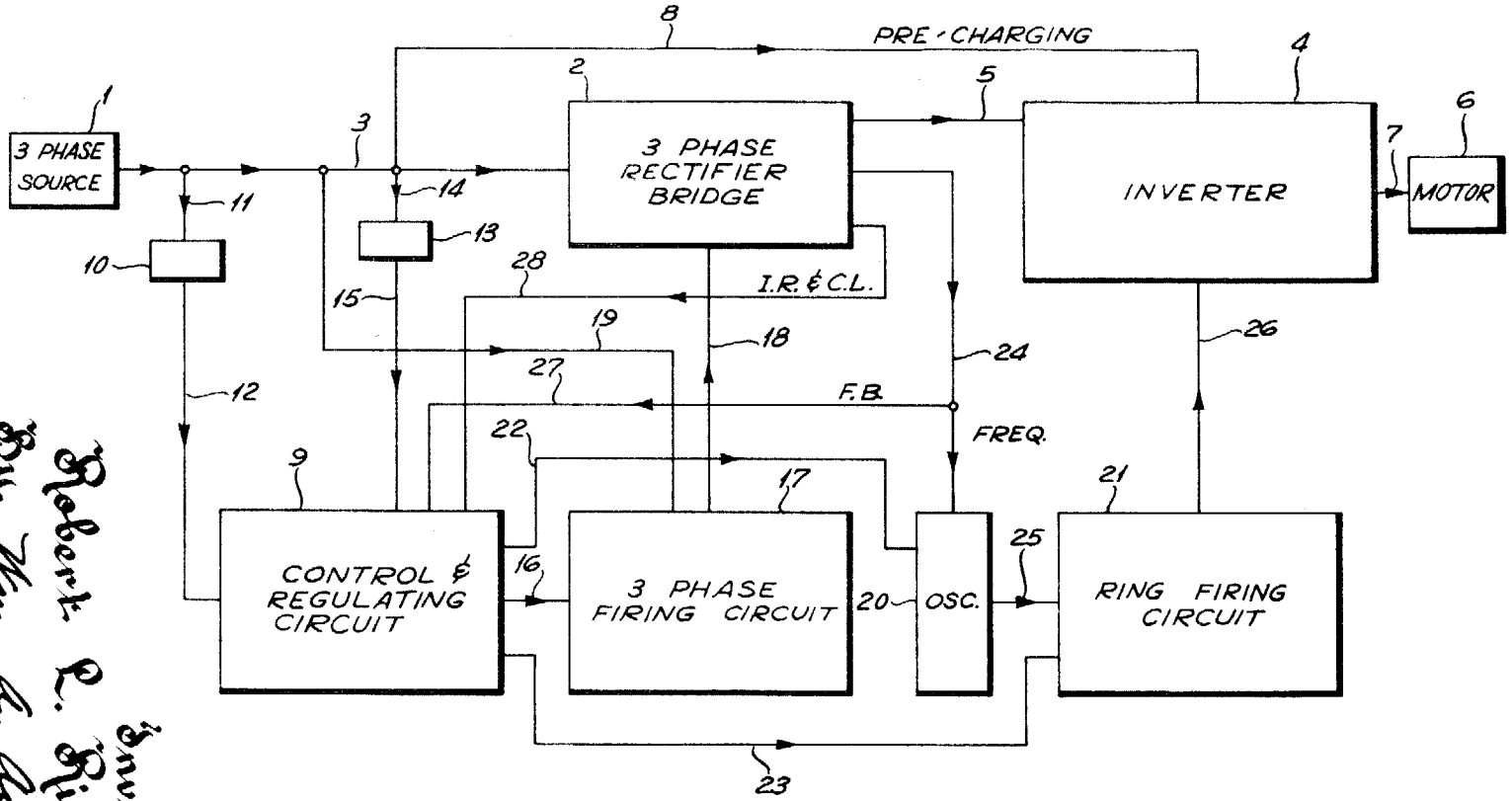
FIGURE 1 is a block diagram illustration of the system.

Referring to FIG. 1, there is shown in block diagram, an adjustable frequency control system in accordance with the invention. A three-phase source 1 supplies a rectifier bridge 2 as indicated by line 3. The unidirectional output of the bridge supplies an inverter 4 as indicated by line 5. The variable frequency output of the inverter is applied to a squirrel cage motor 6 as shown by line 7. As indicated by line 8, source 1 also supplies a precharging circuit in the inverter to precharge the commutating capacitors therein for improved commutation. Source 1 also supplies a control and regulating circuit 9 through a regulating and rectifying power supply circuit 10 as depicted by lines 11 and 12. Source 1 further supplies a mechanically or automatically operated motor speed control transducer 13 as indicated by line 14. This transducer controls circuit 9 as shown by line 15. This being an alternative to a manually controlled reference voltage included in circuit 9 for adjusting the firing angle of the three-phase rectifier bridge.

Control and regulating circuit 9 applies an adjustable unidirectional voltage signal as shown by line 16 for controlling a three-phase firing circuit 17 which in turn controls the firing angle of controlled rectifiers in bridge 2 as depicted by line 18. Alternating current control voltages are applied from source 1 to firing circuit 17 as indicated by line 19 for controlling the development of firing pulses at the proper times when the controlled rectifiers in bridge 2 have positive anode voltage.

Control and regulating circuit 9 in addition supplies operating voltages to an oscillator 20 and a ring firing circuit 21 as depicted by lines 22 and 23, respectively. The frequency of the oscillator is controlled by the output voltage of bridge 2 as indicated by line 24. Since the output voltage of bridge 2 is adjusted from control and regulating circuit 9, the oscillator frequency is under manual or machine control as desired. Oscillator 20 controls ring firing circuit 21 as shown by line 25 and the ring firing circuit controls inverter 4 as depicted by line 26.

For regulation purposes, a feedback voltage is returned from the output of bridge 2 to control and regulating circuit 9 as shown by lines 24 and 27. Also, IR compensation and current limit signals are fed back from the output side of bridge 2 as shown by line 28 for controlling circuit 9 and regulating its output signal to firing circuit 17.

From the foregoing, it will be apparent that three-phase alternating power is rectified and inverted to obtain adjustable frequency for operating a squirrel cage motor. The rectifier is controlled by a three-phase firing circuit whose firing angle is controlled by a D.C. reference voltage by either manual adjustment or by a machine operated transducer. The inverter frequency is controlled by a ring firing circuit which in turn is controlled by a relaxation oscillator. Since the oscillator frequency is the slave of the rectifier output voltage amplitude, the frequency and magnitude of the inverter output voltage can be controlled by manual or transducer adjustment as desirde. When used for energizing a squirrel cage motor, the system affords adjustments of the motor speed by frequency adjustment from a D.C. reference voltage manually or from an A.C. voltage by a transducer.

Figure 2A:
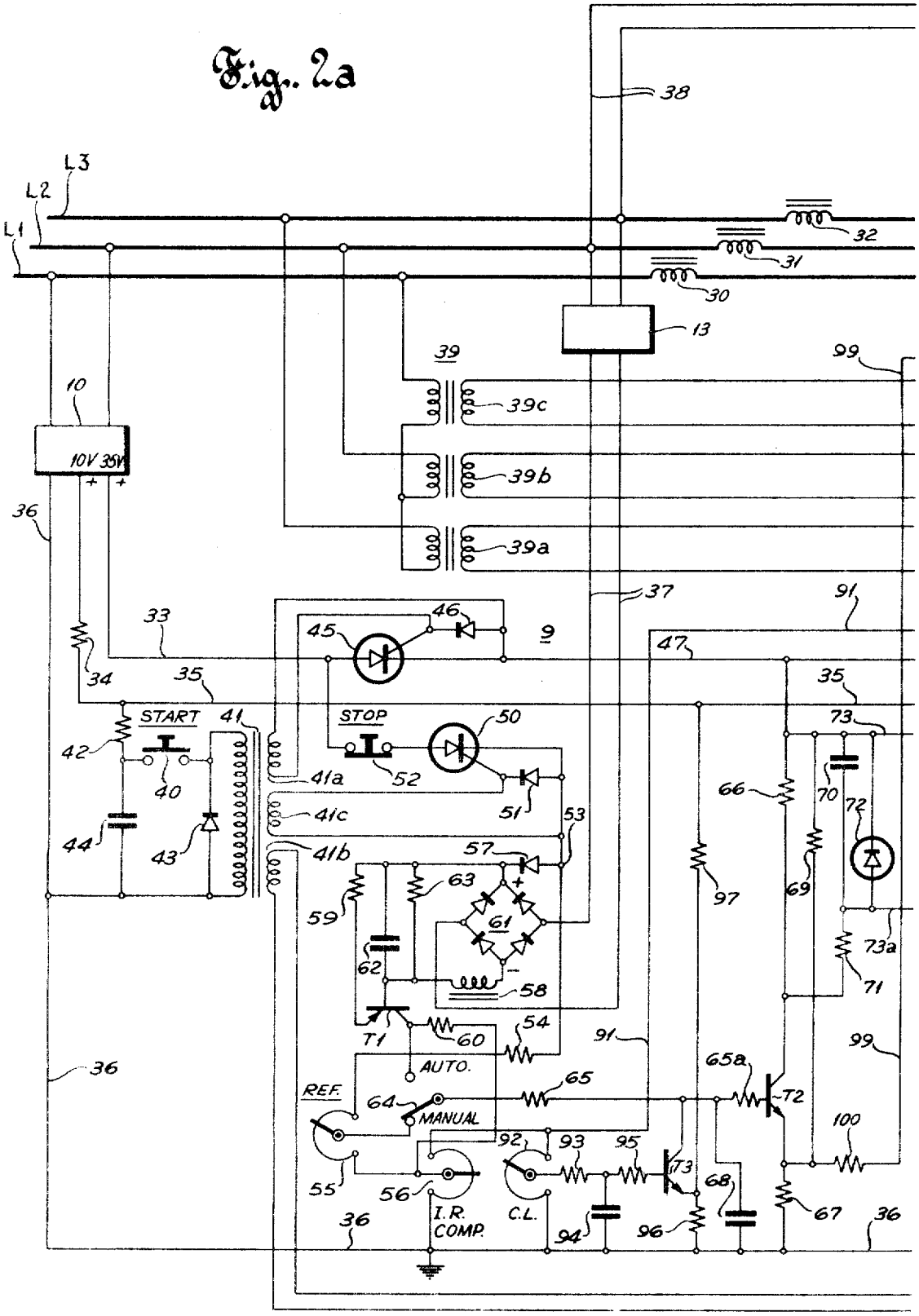
Figure 2C:
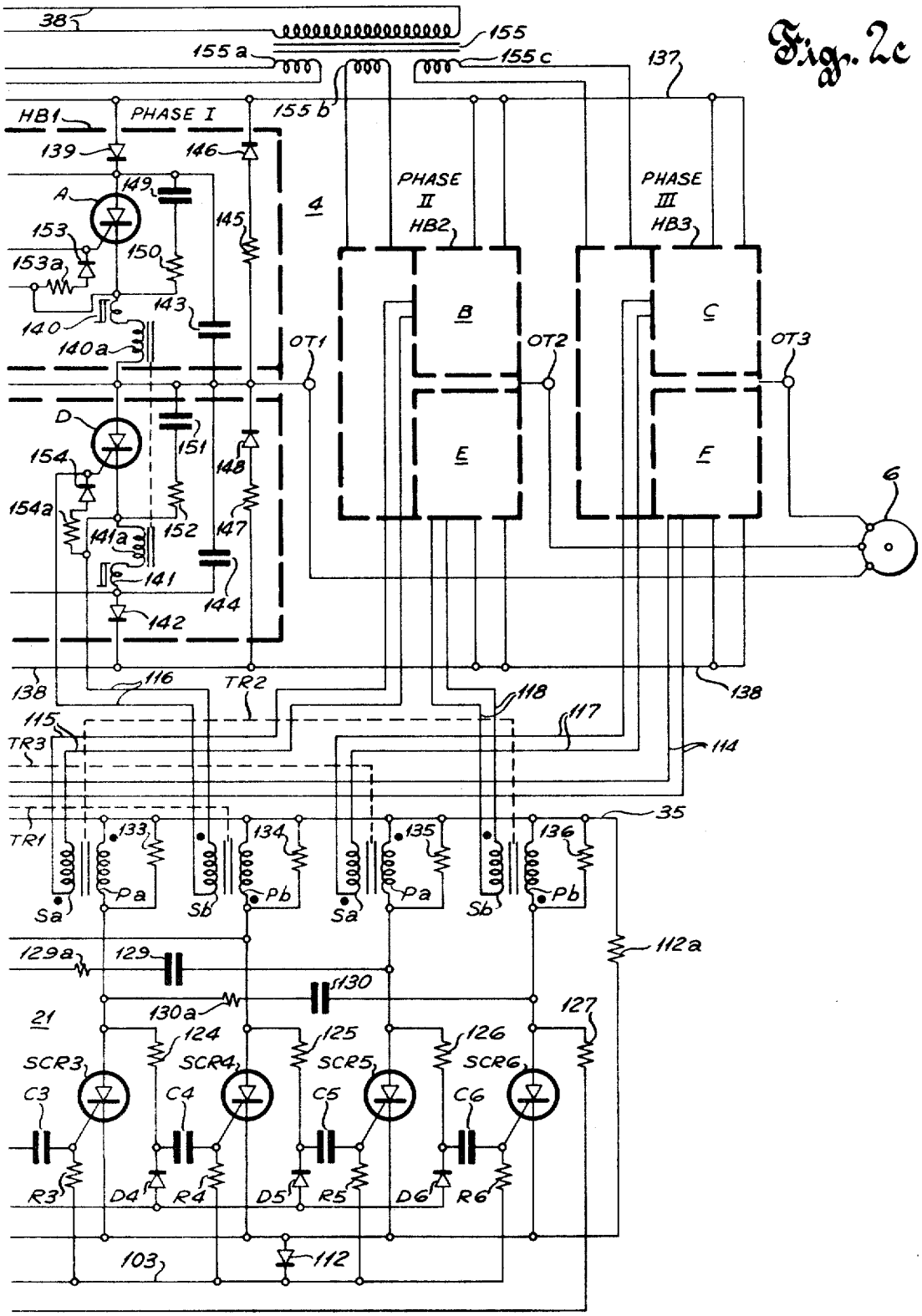

The system hereinbefore described in general terms in connection with FIG. 1 is shown in more detail in FIGS. 2a–c. The reference numerals indicating the rectangles in FIG. 1 are included in FIGS. 2a–c to identify the circuits represented by such rectangles.

Power supply lines L1, L2 and L3 which are connectable to a three-phase alternating current power source in FIG. 2a are connected through respective line inductors 30, 31 and 32 to the three input terminals of three-phase rectifier bridge 2. The inductors limit the rate of change of currents when silicon controlled rectifiers in the bridge are fired or turned off for purposes hereinafter more fully described. Lines L1 and L2 are also connected through a pair of conductors to a direct current power circuit 10. Circuit 10 may be of known type for supplying two voltages such as 10 and 35 volts D.C. to control and regulating circuit 9, three-phase firing circuit 17, oscillator 20 and ring firing circuit 21. For example, circuit 10 may comprise a regulating transformer for providing reduced voltages and a rectifying D.C. power circuit of the M–PAC type or the like for providing 35 volts D.C. on conductor 33 and 10 volts D.C. through resistor 34 to conductor 35, both of these voltages being positive relative to ground at common conductor 36.

To enable automatic or machine control of the motor speed, lines L2 and L3 are connected through a pair of conductors to a transducer circuit 13. This transducer circuit may comprise a voltage step-down transformer and an electromagnetic transducer or the like for applying an adjustable alternating voltage through conductors 37 to control circuit 9. This voltage is an alternative input reference signal to the manually adjustable input reference signal hereinafter described.

To enable pre-charging of the commutating capacitors in the inverter circuit, lines L2 and L3 are connected through a pair of conductors 38 to inverter circuit 4 in FIG. 2c. Lines L1, L2 and L3 are also connected to the three star-connected primary windings of a three-phase transformer 39 in FIG. 2a. Secondary windings 39a, 39b and 39c of the transformer are connected to the respective phase 1, phase 2 and phase 3 subcircuits 17a, 17b and 17c of a three-phase firing circuit 17 to supply control signals thereto as hereinafter more fully described.

The control and regulating circuit shown at the lower portion of FIG. 2a is provided with a start circuit comprising a start [swtich] *switch* 40 of the manual push-button type. Start switch 40 is normally open and is operable to connect the primary winding of a transformer 41 through a current limiting resistor 42 across 10 volt supply conductors 35 and 36. A unidirectional diode 43 is connected across the primary winding of transformer 41 for conducting current in response to induced voltage therein. A smoothing capacitor 44 is connected across start switch 40 and the primary winding of transformer 41.

Transformer 41 is provided with three secondary windings 41a, 41b and 41c for controlling connection of supply voltages to oscillator 20 and ring firing circuit 21 and for controlling connection of reference voltage supply to the manual and automatic control means hereinafter described. For these purposes, secondary winding 41a is connected across the gate and cathode of a silicon controlled rectifier 45, there being a unidirectional diode 46 connected from the cathode to the gate to form a low impedance path for current flow due to induced voltage of positive cathode to gate polarity. This is a switching SCR which connects the 35-volt D.C. supply from con[ctor] *ductor* 33 through conductor 47 to the oscillator in FIG. 2b. Secondary winding 41b is connected across the gate and cathode of a silicon controlled rectifier 48 at the lower portion of FIG. 2b there being a unidirectional diode 49 connected from the cathode to the gate for the same reason as diode 46. This is also a switching SCR which connects the ring firing circuit to ground potential at conductor 36 thereby to provide the ring firing circuit with 10-volt D.C. supply voltage from conductor 35 to ground. Secondary winding 41c is connected across the gate and cathode of a silicon controlled rectifier 50, there being a unidirectional diode 51 connected from the cathode to the gate for the same reason as diode 46. This too is a switching SCR for connecting 35-volt D.C. supply voltage from conductor 33 through a stop switch 52 to a point 53. This voltage is connected from point 53 in two branches to the manual reference voltage adjusting circuit and to the automatic or transducer controlled reference voltage adjusting circuit. For manual control, point 53 is connected through a resistor 54, the resistor of a reference voltage potentiometer 55 and the adjustable tap and lower portion of the resistor of an IR compensation potentiometer 56 to ground. For transducer controlled purposes, point 53 is connected through a unidirectional diode 57, a resistor 59, the emitter and collector of a P-N-P transistor T1, resistor 60 and the movable tap and lower portion of the resistor of potentiometer 56 to ground. Transducer 13 is connected through conductor pair 37 to the input terminals of a full-wave rectifier bridge 61. The positive output terminal of this bridge is connected through resistor 59 to the emitter and the negative output terminal is connected through an inductor or choke 58 to the base for controlling conduction in transistor T1. A smoothing capacitor 62 is connected across inductor 58 and bridge 61 and a shunt resistor 63 is connected across capacitor 62.

A selector switch 64 is provided for selecting either manual controller or transducer controlled reference voltage. This is a single-pole double-throw switch having one stationary contact connected to the movable tap of reference [votlage] *voltage* potentiometer 55 and the other stationary contact connected to the collector of transistor T1. The movable contact of switch 64 is connected through a current limiting or timing resistor 65 and a resistor 65a to the base of an N-P-N transistor T2. Resistor 65a keeps transistor T2 out of switching mode and in amplifying mode.

[Transistors] *Transistor* T2 is the active element of a simple one-stage solid state D.C. amplifier which is used for controlling the three-phase firing circuit in accordance with the input reference voltage and for regulating the system in accordance with feedback signals hereinafter described. Supply voltage is connected from conductor 47 through a load resistor 66 to the collector of transistor T2 and the emitter is connected through a resistor 67 to ground at common conductor 36. A timing capacitor 68 is connected from the junction of resistors 65 and 65a to ground at conductor 36. Capacitor 68 forms with resistor 65 an RC circuit for timing the change in motor speed whenever the input reference voltage value is changed. An "off" bias circuit extends from supply conductor 47 through a resistor 69 and emitter resistor 67 to ground at conductor 36. A capacitor 70 and a resistor 71 are connected in series across load resistor 66 of the amplifier and a voltage limiting device such as a Zener diode 72 is connected across capacitor 70. The amplifier output signal is applied from across capacitor 70 to three-phase firing circuit 17.

Three-phase circuit 17 is provided with means for supplying adjustable phase angle firing voltage pulses to the gate-cathode circuits of the silicon controlled rectifiers in three-phase bridge 2 at times when positive anode voltages are being applied thereto. For this purpose circuit 17 is provided with three sub-circuits 17a, 17b and 17c, one for each phase. Operating voltage is connected from conductor 47 through conductor 73 and input signal voltage is connected through conductor 73a to the three sub-circuits which are also connected to ground at conductor 36. A biasing circuit is connected from conductor 73 through a resistor 74 and a diode 75 to ground at conductor 36. The junction between the resistor and diode is connected to the three firing circuits to provide bias voltages thereto proportional to the voltage drop across diode 75 to prevent inadvertent operation thereof by leakage currents or the like. Control voltages are applied from transformer secondary windings 39a, 39b and 39c to firing sub-circuits 17a, 17b and 17c, respectively, to restrict production of firing pulses during positive anode voltage half-cycles in the bridge and for affording control of the firing circuits throughout their positive anode voltage range. As shown in FIG. 2b, the outputs of firing circuits 17a, 17b and 17c are connected across the gates and cathodes of silicon controlled rectifiers 76, 77 and 78 in bridge 2 to apply firing voltages thereto. Firing sub-circuits 17a–c are shown as rectangles to avoid complicating FIG. 2b and reference may be had to R. W. Spink copending application Serial No. 248,314, filed December 31, 1962, now Patent No. 3,281,645, dated October 25, 1966, for a detailed illustration and description thereof, this copending application being assigned to the assignee of this invention.

In three-phase rectifier bridge 2, the three input terminals are connected to the anode of silicon controlled rectifiers 76, 77, and 78 and also to the cathode of power diodes 79, 80 and 81, respectively. The cathodes of the silicon controlled rectifiers are connected to one another and then through a unidirectional blocking diode 82, an LC filter comprising an inductor 83 and a capacitor 84, and then through an IR drop resistor 85 in series to the anodes of the three diodes 79, 80 and 81. A resistor 86 is connected from the cathode of the silicon controlled rectifiers to the anodes of the diodes. A unidirectional diode 87 is connected across resistor 86 and is poled to conduct current in response to induced voltage of an inductive load so that the silicon controlled rectifiers in the bridge can turn off at their proper times. An RC circuit comprising a resistor 88 and a capacitor 89 in series is connected across silicon controlled rectifier 76. Similar RC circuits are connected across silicon controlled rectifiers 77 and 78, blocking diode 82, inductor 83 and back rectifier or diode 87 for slowing down the rate of change of voltages thereacross. The anodes of diodes 79, 80 and 81 are connected through conductors 90 and 36 to ground in FIG. 2a.

To provide the system with IR compensation, current limit and feedback regulation, control voltages are fed back from the output of the three-phase rectifier bridge to control and regulating circuit 9. For these purposes, the positive side of resistor 85 at the upper portion of FIG. 2b is connected through a conductor 91 and the resistor of IR compensation potentiometer 56 in FIG. 2a to ground. The positive side of this resistor 85 is also connected through conductor 91 and the resistor of a current limit potentiometer 92 to ground at the lower portion of FIG. 2a. The movable tap of current limit potentiometer 92 is connected to a filter and spillover circuit for shunting the input reference voltage from the base of transistor T2. For this purpose the movable tap of potentiometer 92 is connected through a filter circuit comprising a resistor 93 and filter capacitor 94 to ground. The junction of resistor 93 and capacitor 94 is connected through a "taper" resistor 95 to the base of a current limit spillover transistor T3 of the N-P-N conductivity type. The collector of transistor T3 is connected to the input reference voltage at the junction between resistors 65 and 65a near the base of transistor T2 and the emitter is connected through a resistor 96 to ground. Spillover bias voltage is connected from positive D.C. conductor 35 through a resistor 97 to the emitter of transistor T3.

Positive output terminal 98 of the power rectifier bridge at the junction between inductor 83 and capacitor 84 of the output filter is connected through a conductor 99 and a resistor 100 to the emitter of transistor T2 in FIG. 2a to supply feedback voltage to the amplifier.

Oscillator 20 in FIG. 2b is a relaxation oscillator of the unijunction transistor type which supplies variable frequency operating pulses to the ring firing control circuit in accordance with the magnitude of the bridge output voltage. That is, the oscillator frequency is proportional to the filtered output voltage of the threee-phase bridge and the counter voltage of the load. Interbase voltage is supplied to unijunction transistor UT from conductor 47 through silicon controlled rectifier 48 to conductor 36. For this purpose, conductor 47 is connected through a resistor 101 to base B2 whereas base B1 is connected through load resistor 102 to conductor 103, the latter being connected through switching silicon controlled rectifier 48 and conductor 36 to ground. An input signal voltage for the oscillator is connected from positive output terminal 98 of the power filter through a conductor 104, an adjustable resistor 105, a resistor 107 and a capacitor 108 to conductor 103, the junction between resistor 107 and capacitor 108 being connected to the emitter of unijunction transistor UT. Resistor 105 is a trimming resistor affording adjustment of the oscillator frequency to the proper value for a given voltage at terminal 98 to compensate for manufacturing variations in standoff ratio of the unijunction transistor.

The output frequency of the oscillator is set at a predetermined minimum below which it cannot be reduced by adjustment of the reference voltage. For this purposes, supply conductor 47 having a constant D.C. voltage is connected through a resistor 109 to capacitor 108 to supply a minimum charging current to the latter. As can be seen, the capacitor of the relaxation oscillator integrates the voltage output of the power bridge until the unijunction breaks down; it then integrates again until breakdown occurs, etc. This insures constant volt-seconds per half cycle in all phases of the motor. This, of course, assures constant A.C. field strength in the motor. It is also apparent that if sudden changes in motor speed caused by load changes occur, the frequency will follow these voltage changes. This is a very important feature in providing a simple and reliable adjustable frequency system for the following reasons: (1) since frequency is following voltage, saturation is impossible under any condition of load; (2) constant field strength in the motor disallows oscillation between the magnetic energy of the motor field and the filter capacitor C. If the oscillator does not receive feedback of voltage changes due to load changes, a much larger capacitor is required in the filter and a resistor must be inserted across the capacitor during slowdown to prevent motor saturation.

As will be apparent from FIGS. 2b and 2c, oscillator 20 controls ring firing circuit 21 to cause the latter to supply firing voltages to the six silicon controlled rectifiers of the inverter. Ring firing circuit 21 is supplied with operating voltage from conductors 35 and 103. A voltage limiting device such as a Zener diode 111 is connected across conductors 35 and 103. The ring firing circuit is similar to a shift register and comprises a single input taken from oscillator load resistor 102 and six outputs at the center-tapped primary windings of transformers TR1 to TR3 which are arranged to provide firing signals, three at a time. The ring firing circuit comprises six silicon controlled rectifiers SCR1 to SCR6. The anodes of these silicon controlled rectifiers are supplied from a unidirectional voltage at conductor 35 through halves of center-tapped primary windings of output transformers TR1 to TR3. The cathodes of these silicon controlled rectifiers are connected to one another and then through a biasing diode 112 to conductor 103. A resistor 112a is connected from conductor 35 to diode 112. The output transformers are provided with secondary windings connected through pairs of conductors 113, 114, 115, 116, 117 and 118 to the gate-cathode circuits of silicon controlled rectifiers in the static inverter circuit as hereinafter more fully described to supply firing voltages thereto. As shown by the broken lines, primary winding halves Pa and Pb and secondary windings Sa and Sb of transformer TR1 are wound side-by-side on the same core, primary windings halves Pa and Pb and secondary windings Sa and Sb of transformer TR2 similarly have a common core and primary winding halves Pa and Pb and secondary windings Sa and Sb of transformer TR3 similarly have a common core for reasons hereinafter described.

The ring firing circuit is provided with means for initiating operation thereof when supply voltage is applied thereto by silicon controlled rectifier 48. This means comprises a unidirectionally conducting diode 119 and a capacitor 120 connected in series from conductor 35 to the gate of one of the silicon controlled rectifiers such as SCR1, there being a resistor 121 connected across diode 119.

Each silicon controlled rectifier in the ring firing circuit is provided with means for controlling firing of the same in its proper sequence and for maintaining it conducting for the proper length of time. This means comprises a capacitor-diode circuit for each silicon controlled rectifier. Each such capacitor-diode circuit comprises a diode, a capacitor and a resistor. For example, the capacitor-diode circuit for silicon controlled rectifier SCR1 comprises a diode D1, a capacitor C1 and a resistor R1. The corresponding elements of the other capacitor-diode circuits are similarly designated D, C and R, each followed by the numeral of the corresponding silicon controlled rectifier.

Base B1 of unijunction transistor UT is connected through diode D1 in its forward direction and capacitor C1 to the gate of silicon controlled rectifier SCR1. Base B1 is similarly connected in parallel through similar diodes D2–D6 and capacitors C2–C6 to the gates of silicon controlled rectifiers SCR2–6, respectively. The gate of silicon controlled rectifier SCR1 is connected through resistor R1 to conductor 103. The gates of the other silicon controlled rectifiers are connected through similar resistors R2 to R6, respectively, to conductor 103.

The ring firing circuit is also provided with means for applying inhibiting and uninhibiting controls to the silicon conrolled rectifiers thereof. This means comprises a resistor connecting the anode of each silicon controlled rectifier to the capacitor-diode circuit of the succeeding silicon controlled rectifier. For this purpose, resistor 122 connects the anode of SCR1 to the cathode of diode D2. In a similar manner, resistors 123 to 126 connect the anodes of SCR2 to SCR5 to the capacitor-diode circuits of the respectively succeeding silicon controlled rectifiers. And resistor 127 connects the anode of SCR6 to the capacitor-diode circuit of SCR1 to form a ring.

To control commutation of the silicon controlled rectifiers in a predetermined order, a capacitor 128 and a small current limiting resistor 128a are connected in series between the anodes of silicon controlled rectifiers SCR1 and SCR4, a capacitor 129 and a similar small resistor 129a are connected in series between the anodes of SCR2 and SCR5, and a capacitor 130 and a similar small resistor 130a are connected in series between the anodes of SCR3 and SCR6.

Resistors 131 to 136 are connected across the primary winding halves of output transformers TR1 to TR6, respectively, to provide small auxiliary resistive loads to improve the shape of the square wave voltage outputs from the ring firing circuit. For further description of the ring firing circuit, reference may be had to R. L. Risberg copending application Serial No. 382,270, filed July 13, 1964, and assigned to the assignee of this invention.

Static inverter circuit 4 shown in the upper right-hand portion of FIG. 2b and in the upper half of FIG. 2c is supplied with D.C. power from the filtered output of bridge 2 through conductors 137 and 138. Conductor 137 is connected to the positive voltage side of the power filter output at point 98 and conductor 138 is connected to the junction between filter capacitor 84 and series resistor 85. The three output terminals OT1, OT2 and OT3 of the inverter are connected to an inductive load device such as a three-phase alternating current motor 6.

As shown in FIGS. 2b–c, the inverter comprises three two-legged half-bridges HB1, HB2 and HB3 connected in parallel across supply conductors 137 and 138 to form a parallel inverter of the three-phase bridge type. The upper portions of half-bridges HB1–3 are provided with silicon controlled rectifiers A, B and C, respectively, and the lower portions thereof are provided with silicon controlled rectifiers D, E and F, respectively, as indicated in FIG. 2c. Since half-bridges HB2 and HB3 are similar to half-bridge HB1, only the latter will be described in detail, half-bridges HB2 and HB3 being shown schematically to avoid unnecessary duplication.

Half-bridge HB1 is provided at its upper portion or positive leg with a unidirectional diode 139 for conducting current from conductor 137 therethrough and through silicon controller rectifier A, a ferrite inductor 140 and a commutating inductor 140a to output terminal OT1. A path for current flow from the motor for the negative leg of the half-bridge extends from output terminal OT1 through silicon controlled rectifier D, a commutating inductor 141a, a ferrite inductor 141 and a diode 142 in the lower portion or leg of half-bridge HB1 to conductor 138. The windings of inductors 140a and 141a are wound on a common core as a bifilar winding as indicated by the broken line to provide close coupling therebetween. Each ferrite inductor 140 and 141 has its winding wound on its individual core of square hysteresis loop ferrite material. These ferrite inductors are saturating reactors provided for protecting the associated silicon controlled rectifiers from a fast rate of change of current. Without these ferrite inductors, when a silicon controlled rectifier in one leg of the half-bridge is fired, the current therein would jump to the value flowing in the inductive coil in the other leg of the half-bridge and its rate of change would be limited only by the leakage reactance in the inductor coil. The ferrite inductor affords di/dt protection for the silicon controlled rectifier, that is, it slows down the rate of change of current when a silicon controlled rectifier is initially fired. These ferrite cores are magnetically reset by momentary reverse currents through the associated silicon controlled rectifiers just before the latter regain their blocking characteristic.

The upper portion of half-bridge HB1 is provided with a commutating capacitor 143 connected across silicon controlled rectifier A and inductors 140 and 140a. The lower portion of half-bridge HB1 is provided with a similar commutating capacitor 144 connected across silicon controlled rectifier D and inductors 141 and 141a.

To provide a path for current flow due to the induced voltage of the inductor and the induced voltage of the motor or other inductive load device, each leg of each half-bridge is provided with a unidirectional voltage control or feedback circuit thereacross. For this purpose, a resistor 145 and a diode 146 are connected in series from output terminal OT1 to conductor 137 to allow current flow in the reverse direction in shunt of inductors 140 and 140a, silicon controlled rectifier A and diode 139. In a similar manner, a resistor 147 and a diode 148 are connected in series from conductor 138 to output terminal OT1 to allow current flow in the reverse direction in shunt of diode 142, inductors 141 and 141a and silicon controlled rectifier D.

A small capacitor 149 and a small resistor 150 are connected in series across silicon controlled rectifier A between the anode and cathode thereof. A similar capacitor 151 and resistor 152 are connected in series across silicon controlled rectifier D. These circuits function to slow down the rate of change of voltage across the silicon controlled rectifiers and to absorb recovery transients thereon. For a more detailed description of this inverter, reference may be had to R. L. Risberg copending application Serial No. 381,969 filed July 13, 1964, and assigned to the assignee of this invention.

As shown in FIGS. 2b-c, the six pairs of output conductors 113 to 118 of ring firing circuit 21 are arranged to apply firing voltages to the six silicon controlled rectifiers A to F in the inverter in a predetermined order. For this purpose, the conductors of pair 113 are connected to the gate and cathode of silicon controlled rectifier A in the upper portion of half-bridge HB1, there being a unidirectional diode 153 connected in its forward, low impedance direction in series with a small resistor 153a from the cathode to the gate of silicon controlled rectifier A to prevent overlapping currents in the two silicon controlled rectifiers A and D in the same half-bridge. The diode and small resistor across the gate-cathode circuit of the power SCR's allows a large reverse current to flow in the firing transformer secondary winding connected thereto. This current is several times the forward gate current. The larger current during the negative gate period stores energy in the leakage reactance of the firing transformer. Before this gate can be fired with a forward voltage, the reverse control current through the diode and transformer winding must decay to zero. During this decay period, the gate in the power SCR to be commutated off is allowed to switch from positive to negative. This assuers the SCR being turned off will have a negative gate voltage which shortens the recovery time. The firing transformer windings are slightly decoupled by winding each of the four windings on the core side-by-side for the above purposes. The conductors of pairs 114 and 115 are similarly connected to circuits of silicon controlled rectifiers F and B, respectively. The conductors of pair 116 are connected to the gate and cathode of silicon controlled rectifier D in the lower portion of half-bridge HB1, there being a unidirectional diode 154 and a small resistor 154a in series therewith connected from the cathode to the gate for performing a similar function as diode 153 and resistor 153a. The conductors of pairs 117 and 118 are similarly connected to circuits of silicon controlled rectifiers C and E, respectively. The foregoing connections cause three-phase, 120-degree phase displaced firing of the silicon controlled rectifiers in the inverter in the order A, F, B, D, C, E.

The system is provided with means for precharging the commutating capacitors in the inverter from a separate source. This means comprises a transformer 155 having its primary winding connected through conductor pair 38 to supply lines L2 and L3 and being provided with three secondary windings 155a, 155b and 155c. The currents of the three secondary windings are rectified and applied to the three half-bridges, respectively, for precharging the commutating capacitors therein whereby a separate and electrically isolated supply is provided for each phase for precharging. For this purpose, secondary winding 155a is connected to the input terminals of a full-wave rectifier bridge 156. The positive output terminal of bridge 156 is connected through a precharging control resistor 157 to the upper side of commutating capacitor 143. The negative output terminal of bridge 156 is connected to the lower side of commutating capacitor 144. With this connection, commutating capacitors 143 and 144 of half-bridge HB1 are connected in series with resistor 157 across the output terminals of bridge 156. Transformer secondary winding 155b is similarly connected through a rectifier bridge and a precharging control resistor across the two commutating capacitors in half-bridge HB2. And secondary winding 155c is connected in like manner through a rectifier bridge and resistor across the two commutating capacitors in half-bridge HB3 for performing a similar precharging function therein.

The operation of the system of FIGS. 2 a to 2c will now be described with reference to the operating curves shown in FIGS. 3 and 4.

Connection of three-phase alternating voltage to supply lines L, L2 and L3 causes rectifying and voltage regulating circuit 10 to apply 35 volts positive voltage to conductor 33 and 10 volts positive voltage through resistor 34 to conductor 35 relative to grounded conductor 36.

Alternating voltages are applied from the supply lines through transformer 39 to the three-phase sub-circuits 17a, 17b and 17c of firing circuit 17. The function of these voltages is to allow the development of firing pulses at times when positive anode voltages are applied to the SCR's in rectifier bridge 2 and to prevent the development of firing pulses at other times when reverse voltages are being applied to these SCR's as described in the aforementioned R. W. Spink copending patent.

Alternating voltage is also applied from the supply lines through inductors 30, 31 and 32 to the three input terminals of rectifier bridge 2 and through these input terminals to the anodes of silicon controlled rectifiers 76, 77 and 78.

Single phase alternating voltage is applied from supply lines L2 and L3 to transducer circuit 13 and from the latter through conductor pair 37 to bridge 61. Transducer circuit 13, however, is ineffective when selector switch 64, in the lower portion of FIG. 2a, is set as shown for manual control of input reference voltage.

Single phase alternating voltage is also applied from supply lines L2 and L3 through conductor pair 38 to the primary winding of transformer 155 in FIG. 2c. This causes current to flow from transformer secondary winding 155a through rectifier bridge 156 and resistor 157 to charge commutating capacitors 143 and 144 in the first half-bridge HB1 of the inverter circuit. Since these commutating capacitors are connected in series with one another and with resistor 157 to the positive and negative output terminal of bridge 156, each such capacitor will be charged to one-half the value of the output voltage of bridge 156. In a similar manner, the commutating capacitors in half-bridge HB2 are charged from transformer secondary winding 155b. And the commutating capacitors in half-bridge HB3 are likewise charged from transformer secondary winding 155c. The charging just described is not the full precharging hereinbefore mentioned but instead is a lower charging which occurs when power is applied and before the system is operated.

To initiate operation of the system, start switch 49 in the left-hand portion of FIG. 2a is momentarily closed. This causes a pulse of current to flow from the positive 10-volt D.C. supply in circuit 10 through resistors 34 and 42, switch 40, the primary winding of transformer 41 and conductor 36 to ground. As a result, an induced current pulse flows from secondary winding 41a into the gate of silicon controlled rectifier 45. Since positive voltage is being applied from circuit 10 through conductor 33 to the anode, this gate current renders silicon controlled rectifier 45 conducting.

In a similar manner, an induced current pulse flows from transformer secondary winding 41b into the gate of silicon controlled rectifier 48 at the lower portion of FIG. 2b to render it conducting. In like manner, an induced current pulse flows from secondary winding 41c into the gate of silicon controlled rectifier 50 to render it conducting. These three silicon controlled rectifiers continue to conduct following termination of their gate current pulses as long as positive anode voltage is applied thereto. It may be assumed that circuit 10 contains a power disconnect switch for rendering the three switching silicon controlled rectifiers non-conducting when desired.

Silicon controlled rectifiers 45 and 48 cause the positive 35 volts to be applied between conductor 47 and ground at conductor 36. Silicon controlled rectifier 48 additionally causes the positive 10 volts to be applied between conductor 35 to ground at conductor 36. Silicon controlled rectifier 50 causes current flow from conductor 33 through stop switch 52, point 53, resistor 54, the resistor of reference voltage potentiometer 55 and the top and lower portion of the resistor of IR compensation potentiometer 56 to ground. Since switch 64 is set to its lower stationary contact as shown, potentiometer 55 is effective for controlling motor speed and the transducer 13 controlled circuit comprising transistor T1 is ineffective.

Silicon controlled rectifier 45 causes "off" bias of over two volts to be applied to amplifier transistor T2. To this end, current flows from conductor 47 through resistors 69 and 67 in series to ground. Since the junction of these resistors is connected to the emitter of transistor T2, a positive bias voltage is applied thereto to maintain the amplifier transistor "off," requiring a higher positive voltage on the base to turn it "on."

Silicon controlled rectifier 48 causes SCR1 of ring firing circuit 21 to be rendered conducting. When silicon controlled rectifier 48 is fired by closure of the start switch as aforementioned, a 10-volt step voltage is applied across the ring firing circuit and a current pulse flows from conductor 35 through diode 119 and capacitor 120 and then in parallel through resistor R1 and through the gate-cathode circuit of SCR1 and diode 112 to conductor 103, the latter being connected to ground through silicon controlled rectifier 48 and conductor 36. This current pulse fires SCR1.

When the 10-volt step of voltage is applied across the ring firing circuit as aforesaid, the gates of the other silicon controlled rectifiers SCR2 to SCR6 receive a very small step of voltage of about 0.4 volt. For example, the gate of SCR2 receives this small step of voltage due to small current flow from conductor 35 through resistors 131 and 122, capacitor C2 and resistor R2 to conductor 103. The small voltage drop across resistor R2 due to this current flow is applied to the gate of SCR2. To prevent this small voltage pulse and similar small voltage pulses on the other gates from operating silicon controlled rectifiers SCR2 to SCR6, diode 112 is connected in their cathode circuits. Firing of silicon controlled rectifier 48 as aforesaid causes current flow from conductor 35 through resistor 112a and diode 112 to conductor 103. Diode 112 in conducting this current provides a voltage drop of larger magnitude than the small voltage going to the gates of SCR2 to SCR6. Thus, diode 112 applies a reverse bias of about 0.6 volt on the cathodes insuring that no silicon controlled rectifier except SCR1 will be turned "on" in response to firing of pilot silicon controlled rectifier 48.

Firing of SCR1 in the ring firing circuit causes a firing voltage to be applied to silicon controlled rectifier A in inverter circuit 4 and causes a small reverse voltage to be applied to the gate-cathode circuit of silicon controlled rectifier D in the same half-bridge HB1 of the inverter to prevent it from conducting and to prevent overlapping currents in the two SCR's in the same half-bridge. For this purpose, current flow in primary winding Pa of transformer TR1 induces a voltage in secondary winding Sa of the proper polarity to cause current flow through conductor pair 113 to fire silicon controlled rectifier A. This firing voltage in the secondary winding is shown in FIG. 4(c). As indicated by the broken line in FIGS. 2b–c, windings Pb and Sb associated with SCR4 are wound on the same core as the aforesaid windings. Consequently, a voltage of opposite polarity is induced in secondary winding Sb of transformer TR1 to cause a large current flow through conductor pair 116, resistor 154a and diode 154. The combined forward voltage drop of resistor 154a and diode 154 is applied to reverse bias the gate-cathode circuit of silicon controlled rectifier D to prevent firing thereof at the time that silicon controlled rectifier A in the same half-bridge conducts. This small reverse bias voltage is shown at 116 in FIG. 4(c). This negative bias current also stores energy in transformer RT1 as aforesaid.

The operation of controlled bridge 2 will now be described followed by further description of inverter operation. Assuming that reference voltage potentiometer 55 is adjusted at a desired point, firing of silicon controlled rectifier 50 as aforesaid causes current flow through the resistor of this potentiometer. As a result, a positive voltage is applied from the movable tap of potentiometer 55 through switch 64 and resistors 65 and 65a to the base of transistor T2. Since the emitter is connected through resistor 67 to ground, this positive voltage, which is higher than the "off" bias on the emitter, renders the transistor conducting. Current then flows from conductor 47 through resistor 66, the collector and emitter of transistor T2 and resistor 67 to ground.

The output of the amplifier is taken from the collector of transistor T2 and applied through resistor 71 and conductor 73a to operate three-phase firing circuit 17. This control voltage appearing across conductors 73 and 73a is smoothed by capacitor 70 and its maximum value is limited by Zener diode 72 and is then applied to control the three-phase sub-circuits 17a, 17b and 17c. This control voltage causes these three-circuits to produce firing pulses which are applied across the gates and cathodes of silicon controlled rectifiers 76, 77 and 78 in bridge 2. The alternating voltages applied through transformer 39 to these three firing circuits synchronize the firing pulses with the positive anode voltage half-cycles so that silicon controlled rectifiers 76 to 78 are fired in their proper repetitively sequential order.

Figure 3:
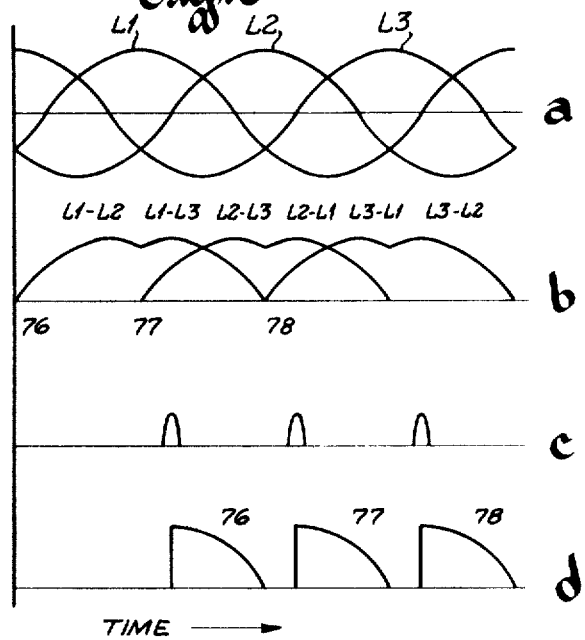
FIGS. 3 and 4 graphically depict operating characteristics of the system of FIGS. 2a–c.
Figure 4:
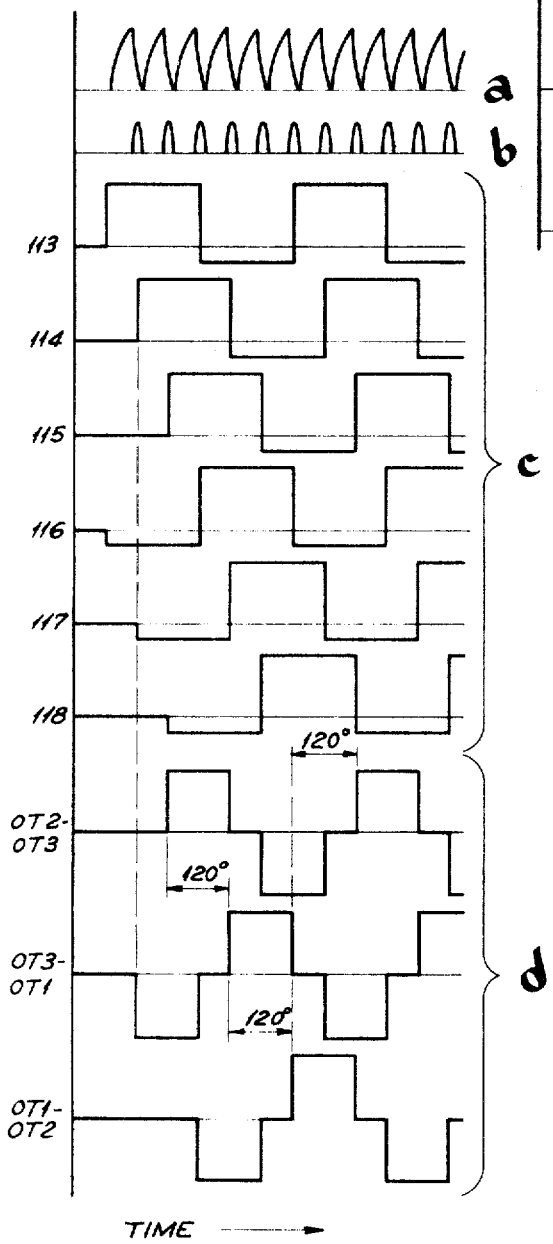

Operating characteristics of rectifier bridge 2 and its firing circuit 17 are illustrated in FIG. 3. In this figure, curves (a) show the three-phase alternating voltage applied from the supply lines to rectifier bridge 2. Curves (b) show the positive anode voltages of silicon controlled rectifiers 76, 77 and 78. Curves (c) show firing pulses applied from firing circuit 17 to the gates of silicon controlled rectifiers 76 and 78. And curves (d) show the resulting output pulses of rectifier bridge 2 before smoothing or filtering thereof. As will be apparent from FIGS. 3 (b), (c) and (d), the angle of the firing pulses as illustrated is such as to provide 90 degree turn-on. Thus, pulses (c) are applied 90 degrees before the ends of the positive anode voltages (b) whereby the silicon controlled rectifiers conduct for the remaining portions of their positive anode voltage periods as shown by curves (d). For a more detailed description of operation of firing circuit 17, reference may be had to the aforementioned R. W. Spink copending patent.

The angle of the firing pulses shown in FIG. 3(c) is controlled from reference voltage potentiometer 55. Turning the movable tap of the latter clockwise causes an increase in the output from the single stage transistor amplifier T2 to the firing circuit. This causes the angle of the firing pulses to be advanced, that is, moved to the left in FIG. 3(c), whereby the silicon controlled rectifiers are fired earlier. As a result, the magnitude of the direct voltage output from rectifier bridge 2 is increased. On the other hand, turning the reference voltage potentiometer in the other direction decreases the amplifier output and retards the angle of the firing pulses. This reduces the magnitude of the direct voltage output from the rectifier bridge.

Since pulse gating of the bridge silicon controlled rectifiers is used, blocking diode 82 at the upper portion of FIG. 2b insures that the cathode voltage will be lower than the anode voltage when a silicon controlled rectifier in bridge 2 is gated. This makes possible additional conduction angle than would be the case if reverse voltage were allowed to turn a silicon controlled rectifier off prematurely.

The output voltage of rectifier bridge 2 is smoothed in the LC filter comprising inductor 83 and capacitor 84 to provide a direct voltage of constant but adjustable magnitude across conductors 137 and 138 as s supply voltage to the inverter circuit.

The function of inductor 83 it to suppress the 180 cycle per second A.C. component of the three-phase bridge output. The function of capacitor 84 is to provide a low impedance path for any 180 cycles per second current passed by-the inductor and to provide a low impedance source to the inverter. When silicon controlled rectifiers are fired in the inverter as hereinafter described, charging currents to the commutating capacitors are drawn from the filter capacitor and after commutation the inductive component of the motor current is fed back to the filter capacitor. The filter capacitor is given a size and capacitance large enough to accommodate such current.

It will be recalled from the foregoing description that silicon controlled rectifier A in the inverter was fired following and as a result of operation of the start switch. The rectifier bridge output voltage causes current to flow from conductor 137 through diode 139, rectifier A, inductors 140 and 140a, capacitor 144 and diode 142 to conductor 138 quickly to charge commutating capacitor 144 to the value of the direct voltage. Pre-charging current also flows from the positive output terminal of bridge 156 through resistor 157, rectifier A, inductors 140 and 140a and capacitor 144 to the negative terminal of bridge 156. It will be apparent that before silicon controlled rectifier A was fired, each commutating capacitor 143 and 144 was charged to one-half the pre-charging voltage. But when silicon controlled rectifier A is fired, current flows therethrough to charge commutating capacitor 144 to the full precharging voltage. Assuming that full supply voltage output from bridge 2 to the inverter is 600 volts D.C., the system would be provided with slightly lower precharging voltage of about 590 volts. Under these conditions, regardless of the magnitude of the adjustable output voltage of bridge 2, firing of silicon controlled rectifier A would cause it to switch pre-charging current to commutating capacitor 144 to charge the latter to 590 volts. Blocking diodes 139 and 142 afford charging of the commutating capacitors to a higher voltage [then] *than* the direct voltage output of the bridge.

The manner in which the oscillator controls the ring firing circuit will now be described. In FIG. 2(b), current flows from conductor 47 through resistor 109 to charge capacitor 108. This current provides the minimum charging rate for the capacitor to set the minimum output frequency of the oscillator. Current proportional to the filtered output voltage of bridge 2 or proportional to the counter voltage of the motor flows from the output side of the filter at point 98 through conductor 104, resistor 105 and resistor 107 additionally to charge capacitor 108. This current is variable in accordance with the magnitude of the voltage on capacitor 84. Capacitor 108 charges as shown in FIG. 4(a). When the capacitor voltage reaches a predetermined value, it fires unijunction transistor UT and discharges through the emitter-base B1 circuit of the latter and resistor 102. The unijunction transistor then stops conducting and the capacitor recharges and discharges repeatedly as shown in FIG. 4(a) to provide output current pulses of a frequency proportional to the voltage on capacitor 84.

Each time capacitor 108 discharges, the unijunction transistor provides an output pulse to ring firing circuit 21 as shown in FIG. 4(b). This output current pulse from the oscillator goes through diode D2 and capacitor C2 to the gate of SCR2 to render SCR2 conducting. This pulse will fire SCR2 because the gates of all the other silicon controlled rectifiers in the ring firing circuit are inhibited. Positive inhibiting voltage is connected from the anodes of non-conducting SCR2–SCR6 to gate circuit diodes D3 to D6 and D1, respectively, through resistors 123 to 127. Since only SCR1 is conducting, the gate of only SCR2 is uninhibited by near ground potential connected from the anode of SCR1 through resistor 122 to diode D2. Thus, the first oscillator output pulse fires SCR2.

Firing of SCR2 initiates an output from the inverter. Firing of SCR2 causes a firing voltage to be applied by primary winding Pb and secondary winding Sb of transformer TR3 through conductor pair 114 to the gate of silicon controlled rectifier F in the lower portion of half-bridge HB3 as shown by curve 114 in FIG. 4(c). Since primary and secondary windings Pa and Sa of transformer TR3 are wound on the same core, a small negative voltage equal to the forward drop of a diode and a small resistor is applied to reverse bias silicon controlled rectifier C in the upper portion of half-bridge HB3 as shown by curve 117 in FIG. 4(c).

Since two silicon controlled rectifiers A and F are now conducting, the inverter provides starting voltage to the motor. Current flows from conductor 137 through the upper portion of half-bridge HB1, output terminal OT1, the motor winding, terminal OT3 and the lower portion of half-bridge HB3 to conductor 138. This output pulse to the motor is shown in FIG. 4(d) as the negative square pulse OT3–OT1.

The second output pulse from oscillator 20 fires SCR3. Since SCR1 and SCR2 are conducting, the inhibiting voltages are removed from the capacitor-diode gate circuits of SCR2 and SCR3. Therefore, the second oscillator pulse goes to the gate of SCR2 and the gate of SCR3. But since SCR2 is already conducting, this second pulse fires SCR3, As a result, windings Pa and Sa of transformer TR2 apply a firing voltage through conductor pair 115 to fire silicon controlled rectifier B in the upper portion of half-bridge HB2. This firing voltage and the corresponding negative bias voltage applied from windings Pb and Sb of transformer TR2 to silicon controlled rectifier E in the lower portion of half-bridge HB2 are shown by curves 115 and 118, respectively in FIG. 4(c). This provides the OT2–OT3 output pulse to the motor that is shown in FIG. 4(d) as a positive square pulse.

The third output pulse from the oscillator causes commutation in the ring firing circuit. That is, the third pulse fires SCR4 to cause SCR1 to be turned off so that only three silicon controlled rectifiers remain conducting in the ring firing circuit. It will be apparent that when SCR1 was rendered conducting, commutating capacitor 128 was charged by current flow from conductor 35 through resistors 134 and 128a, SCR1 and diode 112 to conductor 103. This caused capacitor 128 to be charged to a voltage of positive 10 volts on its right side and near ground potential on its left side. Capacitors 129 and 130 are charged in a similar manner when SCR2 and SCR3 were fired as aforementioned. When the third oscillator pulse renders SCR4 conducting, its anode suddenly drops from positive 10 volts to near ground potential. Since capacitor 128 does not have time to discharge instantaneously when its right side drops from positive 10 volts to near ground potential, its left side momentarily drops from near ground potential to a negative voltage. As ground potential is connected to the cathode, a negative voltage on the anode reverse biases SCR1 to render it non-conducting. Commutating capacitor 128 now charges in the opposite direction, that is, positive voltage on its left side and near ground potential on its right side.

Firing of SCR4 and consequent turning off of SCR1 in the ring firing circuit causes commutation in the inverter. This commutation consists of rendering silicon controlled rectifier D conducting and turning silicon controlled rectifier A off. As shown in FIGS. 4(c) and (d), when a firing voltage is applied through conductor pair 116 to silicon controlled rectifier D, the firing voltage that was being applied through conductor pair 113 to silicon controlled rectifier A terminates. Since all windings of transformer TR1 are wound on the same core, a small negative bias voltage is applied to the gate of silicon controlled rectifier A at the same time as silicon controlled rectifier D is fired. This negative bias voltage on the gate makes it easier to turn off silicon controlled rectifier A by reverse anode-cathode voltage. When silicon controlled rectifier D is fired as aforesaid, precharged commutating capacitor 144 discharges therethrough and through inductors 141 and 141a. As indicated by the broken line in FIG. 2(c), inductors 140a and 141a are closely coupled magnetically by being wound on the same core. The discharge current flow through inductor 141a induces a high voltage in inductor 140a which is applied reversely on the anode-cathode circuit of silicon controlled rectifier A to turn it off. That is, the induced voltage is of a polarity to apply a high positive voltage on the cathode to turn silicon controlled rectifier A off. Just before this turn-off voltage is applied, the aforesaid negative voltage is applied to the gate of silicon controlled rectifier A to help turn if off.

The effect of these commutations is shown in FIGS. 4(c) and (d). SCR2, SCR3 and SCR4 of the ring firing circuit are now conducting to fire silicon controlled rectifiers F, B and D of the inverter. As shown in FIG. 4(c), the firing voltage on conductors 113 terminates and changes to negative bias voltage when the firing voltage on conductors 116 starts. At this same time, the OT3–OT1 negative inverter output pulse terminates and an OT1–OT2 negative or OT2 to OT1 pulse starts as shown in FIG. 4(d).

The oscillator then continues to supply pulses to the ring firing circuit to fire SCR5 and to turn off SCR2, to fire SCR6 and to turn off SCR3, to fire SCR1 and to turn off SCR4, etc. The ring firing circuit operates the silicon controlled rectifiers in the inverter to provide a three-phase output-voltage as shown in FIG. 4(d). As shown therein, each phase of the output voltage is a square wave having 60 degrees dwell on each side of 120 degrees conduction. And the three phases are spaced 120 degrees apart from one another as depicted therein. That is, the positive pulse OT2–OT3 is 120 degrees ahead of the positive pulse OT3–OT1. And the positive pulse OT3–OT1 is 120 degrees ahead of the positive pulse OT1–OT2. The response of an induction motor to this wave is essentially the same as for a sine wave, the total R.M.S. current for integral H.P. motors being approximately 105% of that which would flow in response to a pure sine wave.

Inductors 30, 31 and 32 connected between supply lines L1, L2 and L3 and the respective input terminals of three-phase rectifier bridge 2 perform important functions in the operation of the system to prevent radiation of interference to communication apparatus and the like. Each such inductor comprises two cores, one having square loop saturating ferrite material and the other having low-permeability non-saturating material such as, for example, Arnold Engineering MSS material. The two cores are wound with a single toroidal winding. The inductor could alternatively have a single core of square loop material with an air gap partway through the cross-section to afford a high inductance at low current and a non-saturating inductance at high current as with the composite core.

When the system is free-wheeling through commutating diode 87, these line inductors perform an important function when a silicon controlled rectifier is fired in the three-phase rectifier bridge. These inductors also perform an important function during turn-off of a silicon controlled rectifier in the three-phase rectifier bridge whether the system is operating in continuous current or not. The description hereinafter will be concerned with the continuous current operation.

With the free-wheeling diode conducting in the absence of line inductance, a silicon controlled rectifier in bridge 2 would be fired into a short circuit. That is, free-wheeling diode 87 is substantially zero impedance until it recovers its blocking condition. If no impedance is added at the input to the three-phase bridge, the current through the silicon controlled rectifier that is fired and through the free-wheeling diode in the reverse direction and out of the other supply line could jump to whatever value of current is flowing in the power distribution bus to other loads that are non-inductive. And this current would increase beyond that level of current at a rate determined by the surge impedance of the line. If such short circuit were on the line, the bus could radiate electromagnetic energy and disturb other equipment such as communication apparatus.

By adding the composite core inductors, the silicon controlled rectifier fires into a high impedance provided by the high permeability square loop saturating core. This core remains unsaturated for a minimum of about eight micro-seconds and allows only a fraction of an ampere to flow until it saturates. Upon saturation, the silicon controlled rectifier would again be conducting through a short circuit if it were not for the non-saturating low permeability core. This inductance limits the current increase to a rate equal to the ratio of the instantaneous voltage line to line divided by the inductance. Being oftoroidal construction, this inductor does not radiate its field. The current drawn from the line is of low enough frequency not to interfere with other electronic equipment.

When the line current increases to the value flowing forwardly through the free-wheeling diode, diode recovery begins. Current now flows to the load and also backwards through the free-wheeling diode. After approximately 20 micro-seconds, the diode impedance jumps to near infinite and the current that had been flowing backwards through the free-wheeling diode is diverted to the RC circuit in parallel therewith. The voltage jumps to a value equal to the product of the diverted current times the resistance, about 20 ohms, of the RC circuit. This voltage must be less than the voltage rating of the diode.

The silicon controlled rectifier in the three-phase rectifier bridge now conducts until the instantaneous line voltage reverses in polarity. For a few micro-seconds after the line-to-line voltage reverses, the current continues to flow forwardly through the silicon controlled rectifier because of the energy stored in the line inductance. After this energy has been expended and before the bridge diode recovers its blocking condition, current begins to flow backward through the bridge diode, forward through the free-wheeling diode and backward through the bridge SCR that had been conducting. This current increases at a rate dependent on the instantaneous voltage divided by the inductance of the line inductor. Until the current reaches the coercive ampere turns of the high permeability core, the inductor is essentially only the low permeability non-saturating core inductance. After the coercive ampere turns value is reached, the current is limited by the high permeability inductance. This current is a fraction of an ampere. When the diode in the bridge recivers its blocking condition, the reverse current is diverted to the RC circuit in shunt of the SCR that is directly above the diode in the same branch of the bridge. This produces a step of voltage across the SCR equal to the diverted current times the resistance of the RC circuit. If this voltage step is large with a fast rise, it will cause misfiring of the SCR. The saturating inductance has held the reverse current through the bridge diode to a small value, however, and the voltage step is kept small.

The composite inductors, therefore, prevent interfering radiation when a bridge SCR is fired and prevent misfiring of an SCR during turn-off.

As hereinbefore described, the output voltage magnitude of three-phase rectifier bridge 2 may be adjusted by turning reference voltage potentiometer 55. When the motor speed is turned up, capacitor 68 provides time controlled acceleration of the motor. A feedback voltage is applied without inversion of polarity from point 98 at the output side of the bridge filter through conductor 99 and resistor 100 to the emitter of transistor T2 of the single stage transistor amplifier. This feedback voltage causes current flow through resistor 67 to produce a voltage drop thereacross. It will be apparent that this feedback voltage signal tends to stabilize the operation of the system by turning down the amplifier when the voltage on capacitor 84 goes up and by increasing the amplifier output if the voltage on capacitor 84 should suddenly decrease. The use of the N-P-N transistor single-stage amplifier affords a simple feedback circuit to the emitter of transistor T2 from the last D.C. power stage without voltage polarity problems.

A signal proportional to motor current for IR compensation purposes is fed back to control and regulating circut 9 in the lower portion of FIG. 2a. For this purpose, resistor 85 is connected in the negative side of the three-phase rectifier bridge output between conductor 138 and the anodes of the bridge diodes. This resistor has a small resistance value and the output current flowing therethrough is proportional to the load current. The voltage drop across this resistor is substantially proportional to the motor IR losses. This voltage drop is applied from the positive side of this resistor through conductor 91 and the resistor of IR compensation potentiometer 56 to ground. An adjustable portion of the voltage across potentiometer 56 is taken from the movable tap thereof and added to the reference voltage in the base-emitter circuit to transistor T2 to compensate for IR losses in the motor.

The aforementioned IR compensation circuit also provides for a simple circuit for current limit control. The signal taken from the positive side of resistor 85 is also applied through conductor 91 and the resistor of current limit potentiometer 92 at the lower portion of FIG. 2a to ground. An adjustable portion of the voltage across current limit potentiometer 92 is taken from the movable tap thereof and applied through resistor 93 to filter capacitor 94 to apply a voltage through taper resistor 95 to the base of transistor T3. Taper is defined as the rate of decrease of reference voltage as load current exceeds spillover value. An "off" bias for transistor T3 is obtained by current flow from conductor 35 through resistors 97 and 96 to ground, the voltage at the junction of these resistors being applied to the emitter of transistor T2. If an "off" or spillover bias of plus two volts is applied to the emitter of transistor T3, current limit spillover is obtained when the base voltage exceeds two volts.

The current limit circuit functions to limit the motor current. It was heretofore assumed that an "off" bias of over two volts is applied to the emitter of amplifier transistor T2. This means that the reference voltage must be over two volts at all times in order to operate the amplifier. Under these conditions, a positive voltage of over two volts is applied to the collector of current limit spillover transistor T3. Let it also be assumed that an "off" bias of two volts is applied to the emitter of transistor T3 so that transistor T3 begins to conduct when its base voltage exceeds two volts.

If there is an increase in motor current above a desired adjustable value, more current flows through potentiometer 92 to increase the voltage at the movable tap thereof. This causes current flow through resistor 93 to charge capacitor 94, this being an RC circuit for filtering the current limit signal. This current limit filter is arranged to be faster than the timing of the amplifier input signal by the RC circuit comprising resistor 65 and capacitor 68. In this manner, the current can be limited to any desired value even if the rotor of the motor is locked. When the charge on capacitor 94 exceeds two volts indicating excessive motor current increase, current begins to flow through resistor 95 into the base to turn transistor T3 on. Transistor T3 shunts reference voltage from the base of transistor T2 thereby to reduce the amplifier output. This in turn causes retardation of the angle of the firing pulses from firing circuit 17 to reduce the output of the three-phase rectifier bridge thereby to reduce the increase in motor current. The system is stable in current limit and may be operated in current limit for any length of time. Since the "off" bias on transistor T2 is greater than the spillover bias on transistor T3, the control can be shut down as far as necessary to limit the current.

The level to which the current is desired to be limited may be adjusted on potentiometer 92. The amount of IR compensation voltage that is desired to be added to the reference voltage may be adjusted on potentiometer 56. And the value of reference voltage may be manually adjusted on potentiometer 55 to set the speed of the motor at the desired value.

From the foregoing, it will be apparent that the motor can be started and accelerated to the desired speed by pressing start switch 40 momentarily and adjusting potentiometer 55. The motor speed can be changed as desired from potentiometer 55. The motor is stopped by momentarily pressing stop switch 52. This disconnects anode supply voltage from silicon controlled rectifier 50 to render the latter non-conducting. As a result, the reference voltage is discontinued to reduce to zero the output of the three-phase rectifier bridge. Oscillator 20 still runs at a frequency determined by the counter-voltage of the motor. When the motor stops the oscillator and inverter continue to operate at minimum frequency, but the terminal voltage of the motor is zero.

The system is conditioned for automatic or transducer controlled operation by turning switch 64 to its other position. This disconnects the tap of potentiometer 55 from resistor 65 and connects the collector of transistor T1 thereto. If the start switch is pressed as hereinbefore described, silicon controlled rectifier 50 is rendered conducting. Current flows from conductor 33 through stop switch 52, controlled rectifier 50, point 53, resistor 54 and potentiometers 55 and 56 to ground. The positive voltage at point 53 is applied through diode 57 and resistor 59 as a supply voltage to the emitter of transistor T1, the collector being connected through resistor 60 and IR compensation potentiometer 56 to ground.

Transducer circuit 13 supplies a variable magnitude input control signal to adjust the motor speed. This input signal which may be alternating current is applied from the transducer circuit through conductor pair 37 to the input terminals of rectifier bridge 61. The full-wave rectified signal is applied from the positive output terminal of the bridge through resistor 59 to the emitter and from the negative output terminal of the bridge through inductor 58 to the base of transistor T1. This rectified signal current is smoothed by the filter comprising inductor 58 and capacitor 62 to obtain a direct current signal for controlling transistor T1. This signal is amplified in transistor T1 and added to the IR compensation signal and the sum of these signals is applied from the collector thereof through switch 64 and resistors 65 and 65a to the base of amplifier transistor T2. As a result, the transducer controls the three-phase firing circuit to adjust the speed of the motor in the same manner as hereinbefore described.

The apparatus hereinbefore described provides an efficient static system for selectively controlling the speed of a squirrel cage motor. The ring firing circuit employs a minimum number of components which reduces its cost and enhances its simplicity and reliability and provides a shift register type output which is preferred for firing [inverted silicon] *inverter silicon* controlled rectifiers. That is, the [inverted] *inverter* silicon controlled rectifiers receive on and off control signals and are under continuous and constant gate control. Thus, the ring firing circuit provides a square wave output having alternate 180-degree on and off signals. The ring firing circuit output signals are applied to the inverter in such a manner that the three-phases are displaced from one another by 120 degrees. This displacement is derived from the commutation coupling in the ring firing circuit and connection thereof to the inverter. The output of the ring firing circuit is digital in nature rather than analog and affords an inverter output that is square wave on all three phases and well balanced. The inverter output wave shape does not deteriorate as output voltage and frequency are varied. Harmonic torques are negligible and harmonic heating is small when controlling a standard squirrel cage motor.

The apparatus hereinbefore described including the single stage N-P-N transistor amplifier affords a feedback from the final D.C. power stage directly to the emitter of the amplifier transistor. This allows connection of a feedback voltage from a D.C. load without signal inversion. This preamplifier circuit along with the IR compensation and current limit circuits hereinbefore described are simple in construction and eliminate voltage polarity problems thereby avoiding any need for a negative control voltage.

While the apparatus hereinbefore described is effectively adapted to fulfill the objects stated, it is to be understood that I do not intend to confine my invention to the particular preferred embodiment of adjustable frequency control system disclosed, inasmuch as it is susceptible of various modifications without departing from the scope of the appended claims.

I claim:

1. A control system supplied from an alternating voltage source and providing [an] *a plural-phase* alternating output voltage whose magnitude and frequency are proportionally adjustable and comprising:

controllable rectifier means supplied from said source and being operative to provide a direct voltage output having a controllable magnitude;

control means supplied from said source for applying control signals to said rectifier means and being selectively adjustable to control the magnitude of the direct voltage output of said rectifier means;

a solid state *plural-phase* inverter supplied with the direct voltage output of said rectifier means; and control circuit means *including a single voltage integrator* responsive to the direct voltage output of said rectifier means for controlling said inverter frequency whereby said inverter provides an adjustable *plural-phase* alternating voltage output and proportionally adjustable frequency.

2. The invention defined in claim 1, wherein:

said solid state inverter comprises a three-phase silicon controlled rectifier inverter having three half-bridges connected in parallel with one another across said adjustable direct voltage output of said rectifier means;

and said control circuit means *including a single voltage integrator* comprises an oscillator for providing an output signal having a frequency proportional to the magnitude of the direct voltage output of said rectifier means;

and a shift register of the ring type responsive to the oscillator output signal and comprising means for applying gating signals to the silicon controlled rectifiers in said half-bridges so that the gating signals applied to the two silicon controlled rectifiers in each half-bridge are non-overlapping.

3. The invention defined in claim 2, wherein said shift register of the ring type comprises:

six silicon controlled rectifiers;

means responsive to conduction of said six silicon controlled rectifiers for applying firing signals to the respective silicon controlled rectifiers in said inverter;

means responsive to said oscillator output for rendering three of said six silicon controlled rectifiers conducting in sequence;

and means effective whenever a fourth one of said six silicon controlled rectifiers is rendered conducting for rendering non-conducting the first one thereof.

4. The invention defined in claim 1, together with:

means for deriving a regulating signal from said rectifier means and for applying this regulating signal to said control means to regulate its control effect on said rectifier means.

5. The invention defined in claim 4, wherein said deriving means comprises:

means for providing a feedback signal proportional to the direct voltage input to said inverter and for using this signal to stabilize operation of the system.

6. The invention defined in claim 4, wherein said deriving means comprises:

means for providing a current limit signal proportional to the direct current output of said rectifier means and for using this signal when it exceeds a predetermined adjustable value to operate said control means.

7. A control system supplied from an alternating voltage source for providing [an] a *plural-phase* alternating output voltage whose magnitude and frequency are proportionally variable in response to adjustment of an input reference voltage and comprising:

controllable rectifier means supplied from said source and being operative to provide a direct voltage output having a controllable magnitude;

firing voltage control means supplied from said source for applying firing voltages to said rectifier means to control the magnitude of the direct voltage output thereof;

reference voltage control means for selectively controlling the firing angle of said firing voltages to adjust the magnitude of the direct voltage output of said rectifier means;

a filter comprising a capacitor connected across the output of said rectifier means;

a solid state inverter supplied with the direct voltage from said filter for providing [an] *a plural-phase* alternating output voltage;

and means *including a single voltage integrator* responsive to the voltage on said filter capacitor for controlling the frequency of the inverter output voltage in proportion to the magnitude of said filter capacitor voltage.

8. The invention defined in claim 7, together with:

an inductive load supplied by said inverter;

and means in said inverter for conducting current to said filter capacitor in response to the counter voltage of said load.

9. The invention defined in claim 8, together with:

means for deriving a signal proportional to said filter capacitor voltage;

and means for feeding back said signal to said reference voltage control means to stabilize operation of the system.

10. A static system for controlling the speed of a squirrel cage motor comprising:

an alternating current power supply source;

rectifier means supplied from said source for providing an adjustable direct voltage supply;

a static inverter supplied from said rectifier means for providing an adjustable frequency output voltage to control the speed of the squirrel cage motor;

and means for controlling the frequency and magnitude of the inverter output voltage comprising:

a first firing circuit for controlling said rectifier means;

a control circuit comprising manually adjustable means for controlling said first firing circuit thereby adjustably to control the magnitude of the direct voltage output of said rectifier means;

an oscillator comprising means for controlling the oscillator output frequency proportional to the output voltage of said rectifier means;

and a ring firing circuit controlled by said oscillator for providing alternate 180 degree on and off control signals to control the inverter output frequency to the motor.

11. The invention defined in claim 10, wherein said control circuit also comprises:

transducer means adapted for automatic control by an external condition;

and a selector switch for disconnecting said manually adjustable means and for connecting said transducer means in place thereof.

12. The invention defined in claim 10, together with:

a filter comprising a capacitor for filtering the rectified output voltage of said bridge;

rectifier means rendering said inverter bilateral whereby current also flows backwards therethrough from the motor maintaining a voltage on the filter capacitor proportional to motor counter voltage;

and the oscillator frequency being proportional to said voltage on said filter capacitor thereby preventing motor saturation.

13. A static system for selectively controlling the speed of a squirrel cage motor through a wide speed range comprising:

reference voltage means for providing an adjustable speed reference voltage having a magnitude indicative of the desired speed of the motor;

a single stage transistor amplifier responsive to said speed reference voltage for providing a proportional control voltage;

a three-phase solid state firing circuit responsive to said control voltage for providing firing voltages of proportional phase angle;

a three-phase silicon controlled rectifier bridge supplied from an alternating current source and being responsive to said firing voltages of adjustable phase angle for providing a direct voltage of proportional magnitude;

a filter comprising a capacitor connected to the bridge output;

a solid state oscillator responsive to the direct voltage of said filter for providing an output signal of proportional frequency;

a silicon controlled rectifier ring firing circuit responsive to said oscillator output signal for providing six firing voltages of proportional frequency, each firing voltage having alternately a 180 degree firing signal and a 180 degree off bias, three of said firing voltages having a displacement of 120 degrees relative to one another and the other three firing voltages having phase displacements of 180 degrees relative to respective ones of the first three firing voltages;

and a three-phase silicon controlled rectifier inverter supplied with direct voltage from said filter and being responsive to the firing voltages of said ring firing circuit for providing three-phase alternating voltage to the motor.

14. The invention defined in claim 13, together with:

means between said rectifier bridge and said inverter for deriving a signal voltage proportional to the motor torque;

and means for adding said signal voltage to the speed reference voltage to compensate for the slip of the motor.

15. The invention defined in claim 13, together with:

means between said rectifier bridge and said inverter for deriving a signal voltage proportional to the motor current;

a spillover circuit comprising a transistor connected for shunting the speed reference voltage from said transistor amplifier;

means for voltage biasing said spillover transistor to its non-conducting condition;

and means responsive to said signal voltage indicative of excessive motor current for overcoming said bias to operate said spillover transistor.

16. The invention defined in claim 15, together with:

timing circuit for timing the application of said speed reference signal to said amplifier;

a filter circuit for controlling the application of said signal voltage to said spillover transistor;

and said filter circuit being faster acting than the first mentioned timing circuit.

17. The invention defined in claim 15, together with:

means for applying an off bias voltage to said transistor amplifier which must be overcome by said speed reference voltage in order to operate the same;

and the off bias voltage on said transistor amplifier being greater than the voltage which biases said spillover transistor to its non-conducting condition.

18. The invention defined in claim 13, wherein said inverter comprises:

three half-bridges connected in parallel across said direct voltage;

each said half-bridge comprising two legs each comprising a silicon controlled rectifier and the junction of said legs being connected to a motor terminal;

and means for applying said 180 degree off bias to the silicon controlled rectifier in one leg while said 180 degree firing voltage is applied to the silicon controlled rectifier in the other leg of the same half-bridge.

19. The invention defined in claim 13, wherein said ring firing circuit comprises:

six silicon controlled rectifiers connected in a ring for operation in sequence;

means responsive to said oscillator for operating said six controlled rectifiers three at a time;

and three output transformers with center-tapped primary windings for the respective silicon controlled rectifiers, each having a pair of secondary windings wound on the same core as the associated center-tapped primary winding;

and means comprising a diode connected reversely across each secondary winding to prevent overlapping gating signals to the positive and negative silicon controlled rectifiers of the inverter.

20. The invention defined in claim 19, wherein:

the windings of each transformer are slightly decoupled from one another.

*21. A control system for providing a plural-phase alternating output voltage whose magnitude and frequency are proportionally adjustable comprising:*

*a power supply source;*

*controllable means supplied from said source for providing an adjustable D.C. voltage;*

*a plural-phase inverter supplied with the adjustable D.C. voltage of said controllable means;*

*a resettable integrator including means for integrating said D.C. voltage and resetting means operable each time the integrated voltage reaches a predetermined value for resetting said integrator to a condition from which it starts another integrating operation;*

*means providing an output signal from said resettable integrator;*

*and a firing control circuit operable by said output signal for controlling said inverter to provide a plural-phase A.C. output voltage having a frequency controlled by said resettable integrator.*

*22. An adjustable frequency control system for controlling the speed of a plural-phase A.C. motor comprising:*

*an electric power supply source;*

*selectively controllable means supplied from said source for providing an adjustable D.C. voltage;*

*a plural-phase inverter supplied with said adjustable D.C. voltage and having an output connected to a plural-phase A.C. motor to supply thereto energy of adjustable frequency and proportionally adjustable magnitude to control the motor speed and including means to feed back energy therethrough to the adjustable D.C. voltage providing means to provide a resultant voltage controlled by the motor operation;*

*a resettable integrator including means for integrating said resultant voltage and resetting means operable each time the integrated voltage reaches a predetermined value for resetting said integrator to a condition from which it starts another integrating operation thereby to provide a periodic output;*

*and a firing control circuit operable by said periodic output for controlling said inverter to provide said motor with a plural-phase A.C. output voltage having a frequency controlled by said resettable integrator.*

*23. The invention defined in claim 22, wherein said electric power supply source is a three-phase alternating current source.*

*24. The invention defined in claim 22, wherein said inverter is a three-phase inverter for providing a three-phase alternating current output to the motor.*

References Cited

The following references, cited by the Examiner, are of record in the patented file of this patent or the original patent.

UNITED STATES PATENTS

| | | | |
|---|---|---|---|
| 2,784,365 | 3/1957 | Fenemore | 318—231X |
| 3,105,180 | 9/1963 | Burnett | 318—231X |
| 3,136,937 | 6/1964 | Miljanic | 318—197 |
| 3,200,321 | 10/1965 | Rosenstein | 321—3 |
| 3,214,671 | 10/1965 | Corey | 321—3 |
| 3,259,827 | 7/1966 | Strohmeier | 321—4 |

ORIS L. RADER, Primary Examiner

G. Z. RUBINSON, Assistant Examiner

U.S. Cl. X.R.

318—231; 321—5